US009544905B2

(12) United States Patent
Luan et al.

(10) Patent No.: US 9,544,905 B2
(45) Date of Patent: Jan. 10, 2017

(54) BASEBAND RESOURCE ALLOCATION METHOD AND DEVICE THEREOF

(75) Inventors: Zhuxiao Luan, Shenzhen (CN); Xiaohua Zhou, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 308 days.

(21) Appl. No.: 14/359,190

(22) PCT Filed: Jun. 18, 2012

(86) PCT No.: PCT/CN2012/077106
§ 371 (c)(1),
(2), (4) Date: May 19, 2014

(87) PCT Pub. No.: WO2013/075479
PCT Pub. Date: May 30, 2013

(65) Prior Publication Data
US 2014/0321413 A1 Oct. 30, 2014

(30) Foreign Application Priority Data
Nov. 21, 2011 (CN) .......................... 2011 1 0369218

(51) Int. Cl.
*H04W 72/04* (2009.01)
*H04W 24/02* (2009.01)
*H04W 88/08* (2009.01)

(52) U.S. Cl.
CPC ........... *H04W 72/048* (2013.01); *H04W 24/02* (2013.01); *H04W 88/085* (2013.01)

(58) Field of Classification Search
USPC ........................... 370/328–329; 455/450–464
See application file for complete search history.

(56) References Cited

U.S. PATENT DOCUMENTS

2007/0129071 A1* 6/2007 Shapira ................. H04W 16/06
  455/422.1
2008/0045226 A1* 2/2008 Liu ....................... H04L 5/0037
  455/450

(Continued)

FOREIGN PATENT DOCUMENTS

CN  101175259 A  5/2008
CN  101222773 A  7/2008

(Continued)

OTHER PUBLICATIONS

International Search Report for PCT/CN2012/077106 dated Aug. 30, 2012.

*Primary Examiner* — Charles C Jiang
*Assistant Examiner* — Kyaw Z Soe
(74) *Attorney, Agent, or Firm* — Ling Wu; Stephen Yang; Ling and Yang Intellectual Property

(57) ABSTRACT

A method and an apparatus for automatically allocating baseband resources are disclosed. The method includes: traversing all automatically allocated local cell sets, automatically allocated BP board sets and automatically allocated BBU shelf sets, and generating cell sets to be allocated, allocated cell sets, cell sets to be adjusted, idle BP board sets and associated machine shelf sets; and traversing all automatically allocated BBU shelf sets, and allocating all automatically allocated baseband resource BBU shelf sets to local cells according to an allocation principle. With the above method and apparatus thereof, baseband resources are allocated to a cell cyclically according to the allocation principle, which makes full use of baseband resources, thus utilizing the baseband resources to the greatest extent, and furthermore reducing the manual participation process, lowering the error probability, and greatly improving the work- (Continued)

ing efficiency when establishing base stations on a large scale in a cluster environment.

9 Claims, 1 Drawing Sheet

(56) References Cited

U.S. PATENT DOCUMENTS

| | | | | |
|---|---|---|---|---|
| 2012/0202549 | A1* | 8/2012 | Eriksson | H04W 28/16 455/513 |
| 2013/0017852 | A1* | 1/2013 | Liu | H04W 88/085 455/509 |

FOREIGN PATENT DOCUMENTS

| | | | | |
|---|---|---|---|---|
| CN | 101622820 | A | | 1/2010 |
| CN | 101998441 | A | | 3/2011 |
| CN | 102083077 | A | | 6/2011 |
| CN | 101232654 | B | * | 7/2011 |
| CN | 102413574 | A | | 4/2012 |
| CN | 102083077 | B | * | 8/2013 |
| JP | 2007529926 | A | | 10/2007 |
| JP | 2011139155 | A | | 7/2011 |

* cited by examiner

BASEBAND RESOURCE ALLOCATION METHOD AND DEVICE THEREOF

TECHNICAL FIELD

The patent document relates to wireless communication systems, and in particular, to a method and apparatus for allocating baseband resources in a cluster environment.

BACKGROUND OF THE RELATED ART

In a traditional environment with a single base station, a mapping relationship between cells and baseband processor boards is limited to several baseband processor boards in the local base station. Therefore, the allocation relationship between the cells and the baseband processor boards may be configured manually.

After a cluster environment is introduced, a baseband processor board to which the cell is mapped is not limited to the baseband processor boards within a certain base station. In such cases, if the baseband resources are allocated by using manual configuration, it is a waste of time and energy. In addition, customer service persons need to clearly know the total amount of various resources of the baseband processor boards as well as consumption of resources by various types of cells, which largely increase the workload of the customer service persons and increase pressure on these persons. Moreover, the customer service persons are also required to be capable of good technical ability; and due to manual participation in configuration process, it increases the error probability and largely reduces the working efficiency when establishing base stations on a large scale in a cluster environment.

SUMMARY OF THE INVENTION

The purpose of the embodiments of the present invention is to provide a method and apparatus for automatically allocating baseband resources, wherein, baseband resources are allocated to a cell cyclically according to an allocation principle, which makes full use of baseband resources, thus utilizing the baseband resources to the greatest extent, and reducing the manual participation process, lowering the error probability, and greatly improving the working efficiency when establishing base stations on a large scale in a cluster environment.

The embodiments of the present invention provide a method for automatically allocating baseband resources, comprising:

A. traversing all automatically allocated local cell sets, automatically allocated Baseband Processor (BP) board sets and automatically allocated Base Band Unit (BBU) shelf sets, and generating cell sets to be allocated, allocated cell sets, cell sets to be adjusted, idle BP board sets and associated BBU shelf sets; and B. traversing all automatically allocated BBU shelf sets, and allocating BP board resources in all automatically allocated BBU shelf sets to local cells.

Alternatively, the step A comprises:

A1. traversing all automatically allocated local cells and BP boards, and when a BBU shelf number where Remote Radio Units (RRUs) associated with a first local cell are located is the same as a BBU shelf number of a first BP board, classifying the first local cell and the first BP board into the same automatically allocated BBU shelf set, and counting the number of the automatically allocated BBU shelf sets; and A2. traversing all automatically allocated BBU shelf sets, and generating, for each BBU shelf set, cell sets to be allocated, allocated cell sets, cell sets to be adjusted, idle BP board sets and associated BBU shelf sets.

Alternatively, the step B comprises:

B1. traversing all automatically allocated BBU shelf sets, allocating BP boards of a local shelf in the idle BP board sets of various BBU shelves to cells of the local shelf in the cell sets to be allocated, classifying cells, to which the BP boards of the local shelf have been allocated, into allocated cell sets, and if the BP board resources of the local shelf are insufficient, classifying remaining cells in the cell sets to be allocated into the cell sets to be adjusted;

B2. traversing all automatically allocated BBU shelf sets, and allocating idle baseband resources in the idle BP board sets of other BBU shelves to cells in the cell sets to be adjusted of the local BBU shelf; and B3. traversing all automatically allocated BBU shelf sets, and allocating remaining idle baseband resources in the idle BP board sets of various BBU shelves to cells in the allocated cell sets.

Alternatively, the step B1 comprises:

traversing all automatically allocated BBU shelf sets, allocating cells to be allocated of various BBU shelves to the idle BP board sets, classifying cells, to which idle BP boards have been allocated, into allocated cell sets and removing the BP boards running out of idle resources from the idle BP board sets; and if the cells to be allocated can not be put in the baseband of the local shelf, classifying remaining cells in the cell sets to be allocated into the cell sets to be adjusted, until the cell sets to be allocated of all BBU shelves are empty.

Alternatively, the step B2 comprises:

B21. traversing all automatically allocated BBU shelf sets, and when there exist cells to be adjusted in the cell sets to be adjusted in the automatically allocated BBU shelf sets, turning to step B22;

B22. arranging the associated BBU shelves in the associated machine shelf sets according to a descending order of the idle resources, and traversing the cell sets to be adjusted;

B23. trying to allocate the cells to be adjusted in the cell sets to be adjusted in the arranged associated BBU shelves; and if there is successful allocation in the associated BBU shelves, turning to step B24, and if there is no successful allocation in the associated BBU shelves, turning to step B25;

B24. if there is successful allocation in the associated BBU shelves, adjusting the cells to be classified into the allocated cell sets of the associated BBU shelves, and updating the idle resources of the associated BBU shelves in the associated machine shelf sets, and returning to step B21; and B25. if the cells to be adjusted can not be allocated in the associated BBU shelves, returning a failure, and exiting from the procedure.

Alternatively, the step B3 comprises:

traversing all automatically allocated BBU shelf sets, and if there are idle BP boards in the BBU shelves, classifying all cells in the allocated cell sets into the cell sets to be allocated, and allocating the cells in the cell sets to be allocated to the idle BP boards in turn, and removing the BP boards running out of idle resources from the idle BP boards, until the idle BP board sets in all BBU shelves are empty.

Alternatively, in the step B, the allocation principle for the BP board resources comprises:

local cells and BP boards involved in the manual allocation of the baseband resources not participating in the automatic allocation;

independently allocating BP boards to a first type of cells and a second type of cells respectively;

an allocation order for a third type of cells being: macro cells firstly and indoor cells secondly;

satisfying processing of a local cell on multiple BP boards as much as possible;

when base stations are clustered, giving priority to local cells of one BBU shelf to be allocated in a local shelf, and then an allocation of local cells across shelves being considered if resources of local shelf are not enough for the local cells; or when the local cells are allocated across shelves, limitation of the total number of resources to be exchanged between shelves needing to be satisfied.

The embodiments of the present invention further provide an apparatus for automatically allocating baseband resources, comprising: a generation unit and an allocation unit, wherein, the generation unit is configured to traverse all automatically allocated local cell sets, automatically allocated BP board sets and automatically allocated Base Band Unit (BBU) shelf sets, and generate cell sets to be allocated, allocated cell sets, cell sets to be adjusted, idle BP board sets and associated BBU shelf sets; and the allocation unit is configured to traverse all automatically allocated BBU shelf sets, and allocate all automatically allocated BBU shelf sets to local cells according to an allocation principle.

Alternatively, the generation unit is configured to:

traverse all automatically allocated local cells and BP boards, and when a BBU shelf number where Remote Radio Units (RRUs) associated with a first local cell are located is the same as a BBU shelf number of a first BP board, classifying the first local cell and the first BP board into the same automatically allocated BBU shelf set, and counting the number of the automatically allocated BBU shelf sets; and traverse all automatically allocated BBU shelf sets, and generate, for each BBU shelf set, cell sets to be allocated, allocated cell sets, cell sets to be adjusted, idle BP board sets and associated BBU shelf sets.

Alternatively, the allocation unit is configured to allocate all automatically allocated BBU shelf sets to local cells in a following way:

traversing all automatically allocated BBU shelf sets, allocating BP boards of a local shelf in the idle BP board sets of various BBU shelves to cells of the local shelf in the cell sets to be allocated, classifying allocated cells into allocated cell sets, and if the BP board resources of the local shelf are insufficient, classifying remaining cells in the cell sets to be allocated into the cell sets to be adjusted;

traversing all automatically allocated BBU shelf sets, and allocating idle baseband resources in the idle BP board sets of other BBU shelves to cells in the cell sets to be adjusted of the local BBU shelf; and traversing all automatically allocated BBU shelf sets, and allocating remaining idle baseband resources in the idle BP board sets of various BBU shelves to cells in the allocated cell sets.

Alternatively, the allocation principle for the BP board resources comprises:

local cells and BP boards involved in the manual allocation of baseband resources not participating in the automatic allocation;

independently allocating BP boards to a first type of cells and a second type of cells respectively;

an allocation order for a third type of cells being: macro cells firstly and indoor cells secondly;

satisfying processing of a local cell on multiple BP boards as much as possible;

when base stations are clustered, giving priority to local cells of one BBU shelf to be allocated in a local shelf, and then an allocation of local cells across shelves being considered if the local cells can not be put in the local shelf; and when the local cells are allocated across shelves, limitation of the total number of resources to be exchanged between shelves needing to be satisfied.

Compared with the related art, in a method and apparatus for automatically allocating baseband resources according to the embodiments of the present invention, baseband resources are allocated to a cell cyclically according to the allocation principle by means of automatically allocating baseband resources, which makes full use of baseband resources, thus utilizing the baseband resources to the greatest extent while reducing technical requirements of the customer service persons, and furthermore reducing the manual participation process, lowering the error probability, and greatly improving the working efficiency when establishing base stations on a large scale in a cluster environment.

PREFERRED EMBODIMENTS OF THE PRESENT INVENTION

The embodiments of the present invention will be illustrated in detail hereinafter in conjunction with accompanying drawings. It should be illustrated that, in the case of no conflict, the embodiments of this application and the features in the embodiments could be combined randomly with each other.

The embodiments of the present invention provide a scheme for automatically allocating baseband resources, which allocates BP boards cyclically according to an allocation principle until there is no idle BP board resources, thus utilizing the baseband resources to the greatest extent. A resource configuration table is previously imported in the backstage, to extract cell sets and BP board sets therefrom, and a mapping relationship between the cells and the BP boards is obtained through automatic allocation.

The types of the cells may be divided into a first type of cells, a second type of cells and a third type of cells according to radiuses of the cells and movement speeds and so on, so as to facilitate being processed according to the classification. Wherein, the first type of cells are those with radiuses greater than 40 KM and movement speeds less than 250 KM/H; the second type of cells are those with movement speeds greater than 250 KM/H and radiuses less than 5 KM; and the third type of cells are those with radiuses less than or equal to 40 KM and movement speeds less than or equal to 250 KM/H.

Figure 1:
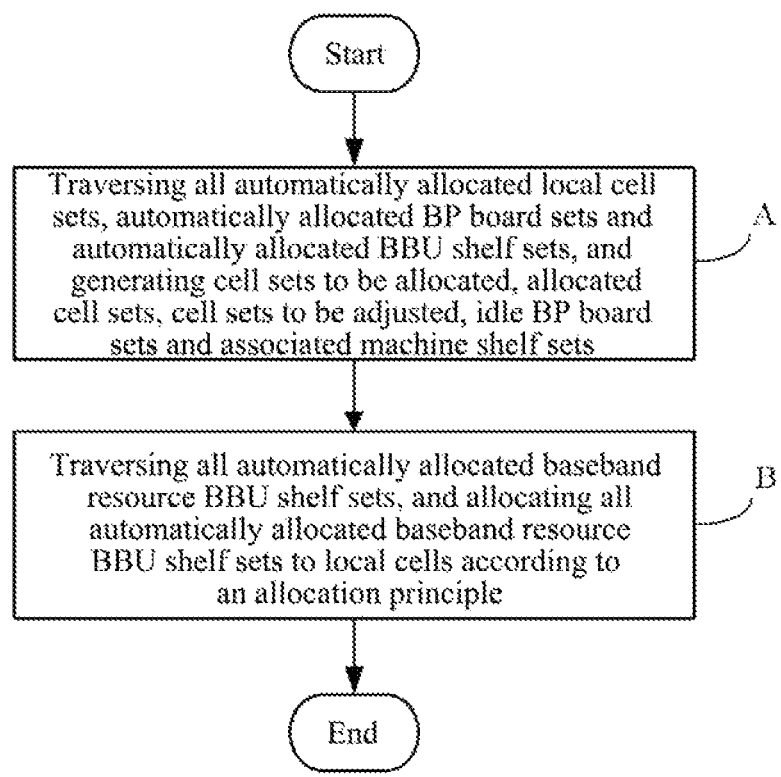
FIG. 1 is a flowchart of a method for automatically allocating baseband resources according to an embodiment of the present invention.

Each BBU shelf set defines the following configuration sets according to the requirements of the processing, which is illustrated as follows:

cell sets to be allocated: local cell sets needed to be allocated in the local BBU shelf;

allocated cell sets: cell sets to which BP (Baseband Processor) boards have been allocated in the local BBU shelf;

cell sets to be adjusted: local cell sets needed to be adjusted to other BBU shelves;

idle BP board sets: BP board sets capable of bearing local cells; and associated machine shelf sets: sets of associated BBU shelves to which the local cells of the local shelf can be adjusted;

As shown in FIG. 1, the embodiments of the present invention provide a method for automatically allocating baseband resources, comprising:

step A: traversing all automatically allocated local cell sets, automatically allocated BP board sets and automatically allocated BBU shelf sets, and generating cell sets to be allocated, allocated cell sets, cell sets to be adjusted, idle BP board sets and associated machine shelf sets, which specifically comprises:

step A1: traversing all automatically allocated local cells and BP boards, and if a BBU shelf number where RRUs associated with a local cell are located is the same as a BBU shelf number of the BP, classifying the local cell and the BP into the same automatically allocated BBU shelf set, and counting the number of the automatically allocated baseband resource BBU shelf sets; and step A2: traversing all automatically allocated BBU shelf sets, and generating resource sets for various BBU shelves, which are cell sets to be allocated, cell sets to be adjusted, idle BP board sets and associated BBU shelf sets; and step B: traversing all automatically allocated BBU shelf sets, and allocating BP board resources in all automatically allocated BBU shelf sets to local cells according to an allocation principle.

Wherein, the allocation principle for the BP board resources is as follows:

1) local cells and BP boards involved in the manual allocation of baseband resources not participating in the automatic allocation and only validity check being performed and a result being output;

2) independently allocating BP boards to a first type of cells and a second type of cells respectively;

3) an allocation order for a third type of cells being: macro cells firstly and indoor cells secondly;

4) satisfying processing of a local cell on multiple BP boards as much as possible;

5) when base stations are clustered, giving priority to local cells of one BBU shelf to be allocated in a local shelf, and then an allocation of local cells across shelves being considered if the local cells can not be put in the local shelf; or 6) when the local cells are allocated across shelves, limitation of the total number of resources to be exchanged between shelves needing to be satisfied.

The step B specifically comprises:

step B1: traversing all automatically allocated BBU shelf sets, allocating BP boards of a local shelf in the idle BP board sets to cells of the local shelf in the cell sets to be allocated according to an allocation principle, classifying cells, to which the BP boards of the local shelf have been allocated, into allocated cell sets, and if the BP board resources of the local shelf are insufficient, classifying remaining cells in the cell sets to be allocated into the cell sets to be adjusted, which specifically comprises:

traversing all automatically allocated BBU shelf sets, allocating cells to be allocated of various BBU shelves to the idle BP board sets for only one round, classifying cells, to which idle BP boards have been allocated, into allocated cell sets and removing the BP boards running out of idle resources from the idle BP board sets; and if the cells to be allocated can not be put in the BP of the local shelf, classifying remaining cells in the cell sets to be allocated into the cell sets to be adjusted, until the cell sets to be allocated of all BBU shelves are empty;

step B2: traversing all automatically allocated BBU shelf sets, and allocating idle baseband resources of other shelves in the idle BP board sets to cells in the cell sets to be adjusted according to an allocation principle, which specifically comprises:

step B21: traversing all automatically allocated BBU shelf sets, and determining whether the cell sets to be adjusted in all BBU shelves are empty, and if there exist cells to be adjusted in the cell sets to be adjusted, turning to step B22;

step B22. arranging the associated BBU shelves in the associated machine shelf sets according to a descending order of the idle resources, and traversing the cell sets to be adjusted;

step B23. trying to allocate the cells to be adjusted in the cell sets to be adjusted in the arranged associated BBU shelves; and if there is successful allocation in the associated BBU shelves, turning to step B24; otherwise, turning to step B25;

step B24. if there is successful allocation in the associated BBU shelves, adjusting the cells to be classified into the allocated cell sets of the associated BBU shelves, and updating the idle resources of the associated BBU shelves in the associated machine shelf sets, and returning to step B21; and step B25. if the cells to be adjusted can not be allocated in the arranged associated BBU shelves, returning a failure, and exiting from the procedure;

step B3: traversing all automatically allocated BBU shelf sets, and allocating remaining idle baseband resources in the idle BP board sets to cells in the allocated cell sets according to an allocation principle, which specifically comprises:

traversing all automatically allocated BBU shelf sets, and if there are idle BP boards in the BBU shelves, classifying all cells in the allocated cell sets into the cell sets to be allocated, and allocating the cells in the cell sets to be allocated to the idle BP boards in turn, and removing the BP boards running out of idle resources from the idle BP boards, until the idle BP board sets in all BBU shelves are empty.

Figure 2:
FIG. 2 is a diagram of an apparatus for automatically allocating baseband resources according to an embodiment of the present invention.

As shown in FIG. 2, the embodiments of the present invention provide an apparatus for automatically allocating baseband resources, comprising: a generation unit 10 and an allocation unit 20, wherein, the generation unit 10 is configured to traverse all automatically allocated local cell sets, automatically allocated Baseband Processor (BP) board sets and automatically allocated BBU shelf sets, and generate cell sets to be allocated, allocated cell sets, cell sets to be adjusted, idle BP board sets and associated machine shelf sets; and the allocation unit 20 is configured to traverse all automatically allocated BBU shelf sets generated by the generation unit 10, and allocate all automatically allocated BBU shelf sets to local cells according to an allocation principle.

Wherein, the allocation principle for the BP board resources is as follows:

1) local cells and BP boards involved in the manual allocation of baseband resources not participating in the automatic allocation and only validity check being performed and a result being output;

2) independently allocating BP boards to a first type of cells and a second type of cells respectively;

3) an allocation order for a third type of cells being: macro cells firstly and indoor cells secondly;

4) satisfying processing of a local cell on multiple BP boards as much as possible;

5) when base stations are clustered, giving priority to local cells of one BBU shelf to be allocated in a local shelf, and then an allocation of local cells across shelves being considered if the local cells can not be put in the local shelf;

6) when the local cells are allocated across shelves, limitation of the total number of resources to be exchanged between shelves needing to be satisfied.

The allocation unit 20 is configured to allocate all automatically allocated BBU shelf sets to local cells according to an allocation principle. The specific allocation process is as follows:

traversing all automatically allocated BBU shelf sets, allocating BP boards of a local shelf in the idle BP board sets to cells of the local shelf in the cell sets to be allocated according to the allocation principle, classifying cells, to which the BP boards of the local shelf have been allocated, into allocated cell sets, and if the BP board resources of the local shelf are insufficient, classifying remaining cells in the cell sets to be allocated into the cell sets to be adjusted;

traversing all automatically allocated BBU shelf sets, and allocating idle baseband resources in the idle BP board sets of other shelves to cells in the cell sets to be adjusted according to the allocation principle; and traversing all automatically allocated BBU shelf sets, and allocating remaining idle baseband resources in the idle BP board sets to cells in the allocated cell sets according to the allocation principle.

A person having ordinary skill in the art can understand that all or a part of steps in the above method can be implemented by programs instructing related hardware, which can be stored in a computer readable storage medium, such as a read-only memory, a disk or CD etc. Alternatively, all or a part of steps in the above embodiments can also be implemented by one or more integrated circuits. Accordingly, each module/unit in the above embodiments can be implemented in the form of hardware, or can also be implemented in the form of software functional module. The patent document is not limited to any particular form of a combination of hardware and software.

It should be illustrated that, the patent document can have a plurality of other embodiments. Without departing from the spirit and substance of the patent document, those skilled in the art can make various corresponding changes and variations according to the patent document, and all these corresponding changes and variations should belong to the protection scope of the appended claims in the patent document.

INDUSTRIAL APPLICABILITY

In a method and apparatus for automatically allocating baseband resources according to the embodiments of the present invention, baseband resources are allocated to a cell cyclically according to the allocation principle by means of automatically allocating baseband resources, which makes full use of baseband resources and reduces technical requirements of the customer service persons; and due to the reduction in the manual participation process, it also lowers the error probability, and greatly improves the working efficiency when establishing base stations on a large scale in a cluster environment.

What is claimed is:

1. A method for automatically allocating baseband resources, comprising:
   A. traversing all automatically allocated local cell sets, automatically allocated Baseband Processor (BP) board sets and automatically allocated Base Band Unit (BBU) shelf sets, and generating cell sets to be allocated, allocated cell sets, cell sets to be adjusted, idle BP board sets and associated BBU shelf sets; and
   B. traversing all automatically allocated BBU shelf sets and allocating BP board resources in all automatically allocated BBU shelf sets to local cells;
   wherein, the step B comprises:
   B1. traversing all automatically allocated BBU shelf sets, allocating BP boards of a local shelf in the idle BP board sets of various BBU shelves to cells of the local shelf in the cell sets to be allocated, classifying cells, to which the BP boards of the local shelf have been allocated, into the allocated cell sets, and if BP board resources of the local shelf are insufficient, classifying remaining cells in the cell sets to be allocated into the cell sets to be adjusted;
   B2. traversing all automatically allocated BBU shelf sets, and allocating idle baseband resources in the idle BP board sets of other BBU shelves to cells in the cell sets to be adjusted of a local BBU shelf; and
   B3. traversing all automatically allocated BBU shelf sets, and allocating remaining idle baseband resources in the idle BP board sets of various BBU shelves to cells in the allocated cell sets.

2. The method according to claim 1, wherein, the step A comprises:
   A1. traversing all automatically allocated local cells and BP boards, and when a BBU shelf number where Remote Radio Units (RRUs) associated with a first local cell are located is the same as a BBU shelf number of a first BP board, classifying the first local cell and the first BP board into the same automatically allocated BBU shelf set, and counting the number of the automatically allocated BBU shelf sets; and
   A2. traversing all automatically allocated BBU shelf sets, and generating, for each BBU shelf set, cell sets to be allocated, allocated cell sets, cell sets to be adjusted, idle BP board sets and associated BBU shelf sets.

3. The method according to claim 1, wherein, the step B1 comprises:
   traversing all automatically allocated BBU shelf sets, allocating cells to be allocated of various BBU shelves to the idle BP board sets, classifying cells, to which idle BP boards have been allocated, into the allocated cell sets and removing BP boards running out of idle resources from the idle BP board sets; and if the cells to be allocated can not be put in basebands of the local shelf, classifying remaining cells in the cell sets to be allocated into the cell sets to be adjusted until the cell sets to be allocated of all BBU shelves are empty.

4. The method according to claim 1, wherein, the step B2 comprises:
   B21. traversing all automatically allocated BBU shelf sets, and when there exist cells to be adjusted in the cell sets to be adjusted in the automatically allocated BBU shelf sets, turning to step B22;

B22. arranging associated BBU shelves in associated machine shelf sets according to a descending order of idle resources, and traversing the cell sets to be adjusted;

B23. trying to allocate the cells to be adjusted in the cell sets to be adjusted in the arranged associated BBU shelves; and if there is successful allocation in the associated BBU shelves, turning to step B24, and if there is no successful allocation in the associated BBU shelves, turning to step B25;

B24. if there is successful allocation in the associated BBU shelves, adjusting cells to be classified into the allocated cell sets of the associated BBU shelves, and updating the idle resources of the associated BBU shelves in the associated machine shelf sets, and returning to step B21; and B25. if the cells to be adjusted can not be allocated in the associated BBU shelves, returning a failure, and exiting from procedures.

5. The method according to claim 1, wherein, the step B3 comprises:

traversing all automatically allocated BBU shelf sets, and if there are idle BP boards in the BBU shelves, classifying all cells in the allocated cell sets into the cell sets to be allocated, and allocating cells in the cell sets to be allocated to the idle BP boards in turn, and removing BP boards running out of idle resources from the idle BP boards until the idle BP board sets in all BBU shelves are empty.

6. The method according to claim 1, wherein, in the step B, an allocation principle for the BP board resources comprises:

local cells and BP boards involved in a manual allocation of baseband resources not participating in an automatic allocation;

independently allocating BP boards to a first type of cells and a second type of cells respectively;

an allocation order for a third type of cells being: macro cells firstly and indoor cells secondly;

satisfying processing of one local cell on multiple BP boards;

when base stations are clustered, giving priority to local cells of one BBU shelf to be allocated in a local shelf, and then an allocation of local cells across shelves being considered if the local cells can not be put in the local shelf; or when local cells are allocated across shelves, limitation of the total number of resources to be exchanged between shelves needing to be satisfied.

7. An apparatus for automatically allocating baseband resources, comprising hardware performing instructions stored in a non-transitory computer readable medium which executes steps in following units: a generation unit and an allocation unit, wherein, the generation unit is configured to traverse all automatically allocated local cell sets, automatically allocated Baseband Processor (BP) board sets and automatically allocated Base Band Unit (BBU) shelf sets, and generate cell sets to be allocated, allocated cell sets, cell sets to be adjusted, idle BP board sets and associated BBU shelf sets; and the allocation unit is configured to traverse all automatically allocated BBU shelf sets, and allocate all automatically allocated BBU shelf sets to local cells according to an allocation principle in a following way:

traversing all automatically allocated BBU shelf sets, allocating BP boards of a local shelf in the idle BP board sets of various BBU shelves to cells of the local shelf in the cell sets to be allocated, classifying cells, to which the BP boards of the local shelf have been allocated, into the allocated cell sets, and if BP board resources of the local shelf are insufficient, classifying remaining cells in the cell sets to be allocated into the cell sets to be adjusted;

traversing all automatically allocated BBU shelf sets, and allocating idle baseband resources in the idle BP board sets of other BBU shelves to cells in the cell sets to be adjusted of a local BBU shelf; and traversing all automatically allocated BBU shelf sets, and allocating remaining idle baseband resources in the idle BP board sets of various BBU shelves to cells in the allocated cell sets.

8. The apparatus according to claim 7, wherein, the generation unit is configured to:

traverse all automatically allocated local cells and BP boards, and when a BBU shelf number where Remote Radio Units (RRUs) associated with a first local cell are located is the same as a BBU shelf number of a first BP board, classify the first local cell and the first BP board into the same automatically allocated BBU shelf set, and count the number of the automatically allocated BBU shelf sets; and traverse all automatically allocated BBU shelf sets, and generate, for each BBU shelf set, cell sets to be allocated, allocated cell sets, cell sets to be adjusted, idle BP board sets and associated BBU shelf sets.

9. The apparatus according to claim 7, wherein, the allocation principle for BP board resources comprises:

local cells and BP boards involved in a manual allocation of baseband resources not participating in an automatic allocation;

independently allocating BP boards to a first type of cells and a second type of cells respectively;

an allocation order for a third type of cells being: macro cells firstly and indoor cells secondly;

satisfying processing of one local cell on multiple BP boards;

when base stations are clustered, giving priority to local cells of one BBU shelf to be allocated in a local shelf, and then an allocation of local cells across shelves being considered if the local cells can not be put in the local shelf; or when local cells are allocated across shelves, limitation of the total number of resources to be exchanged between shelves needing to be satisfied.

* * * * *